June 16, 1959 G. H. SCHURGER ET AL 2,890,629
MACHINE TOOL
Filed Dec. 1, 1953 9 Sheets-Sheet 7
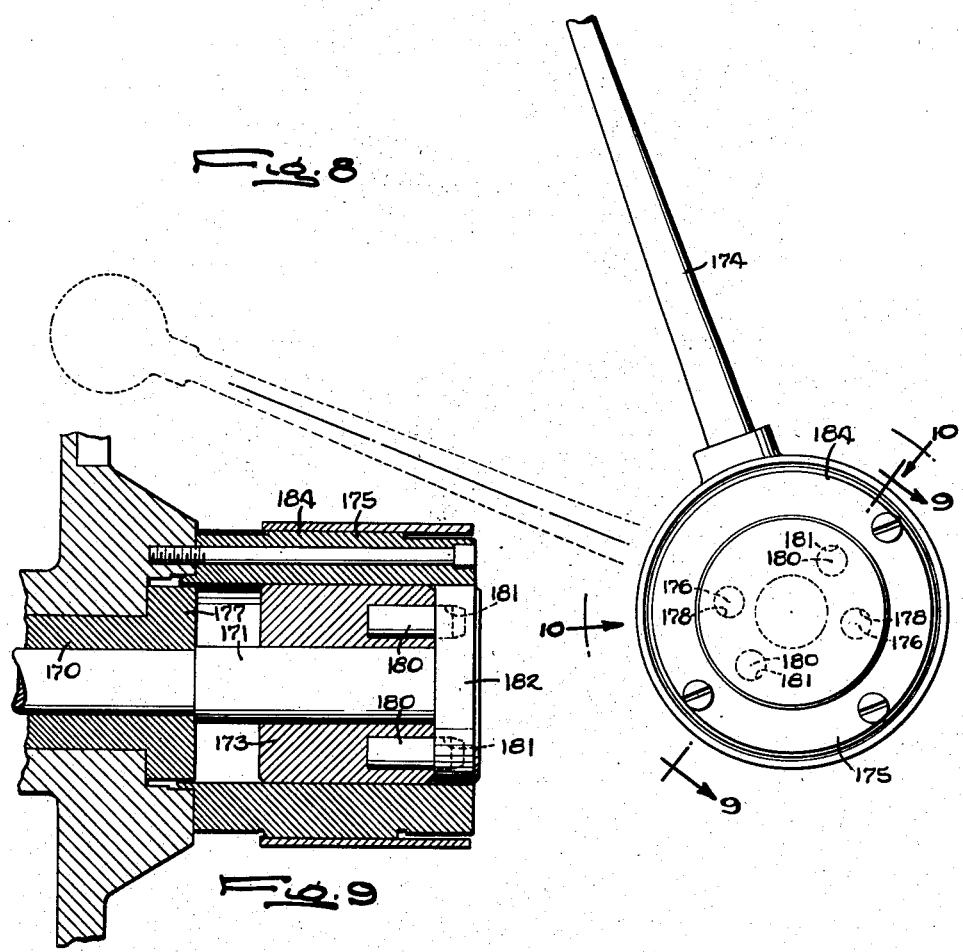
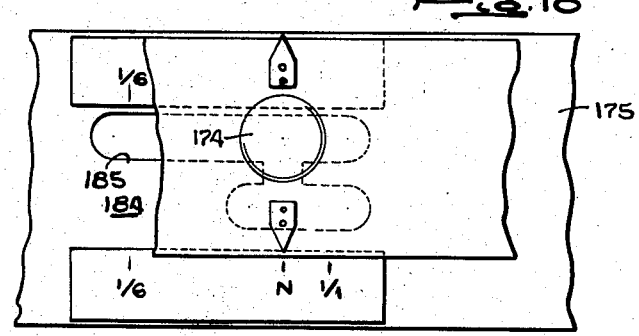
INVENTORS
Garner H. Schurger
Roland F. Hecker
Carlson, Pitzner, Hubbard & Wolfe
ATTORNEYS

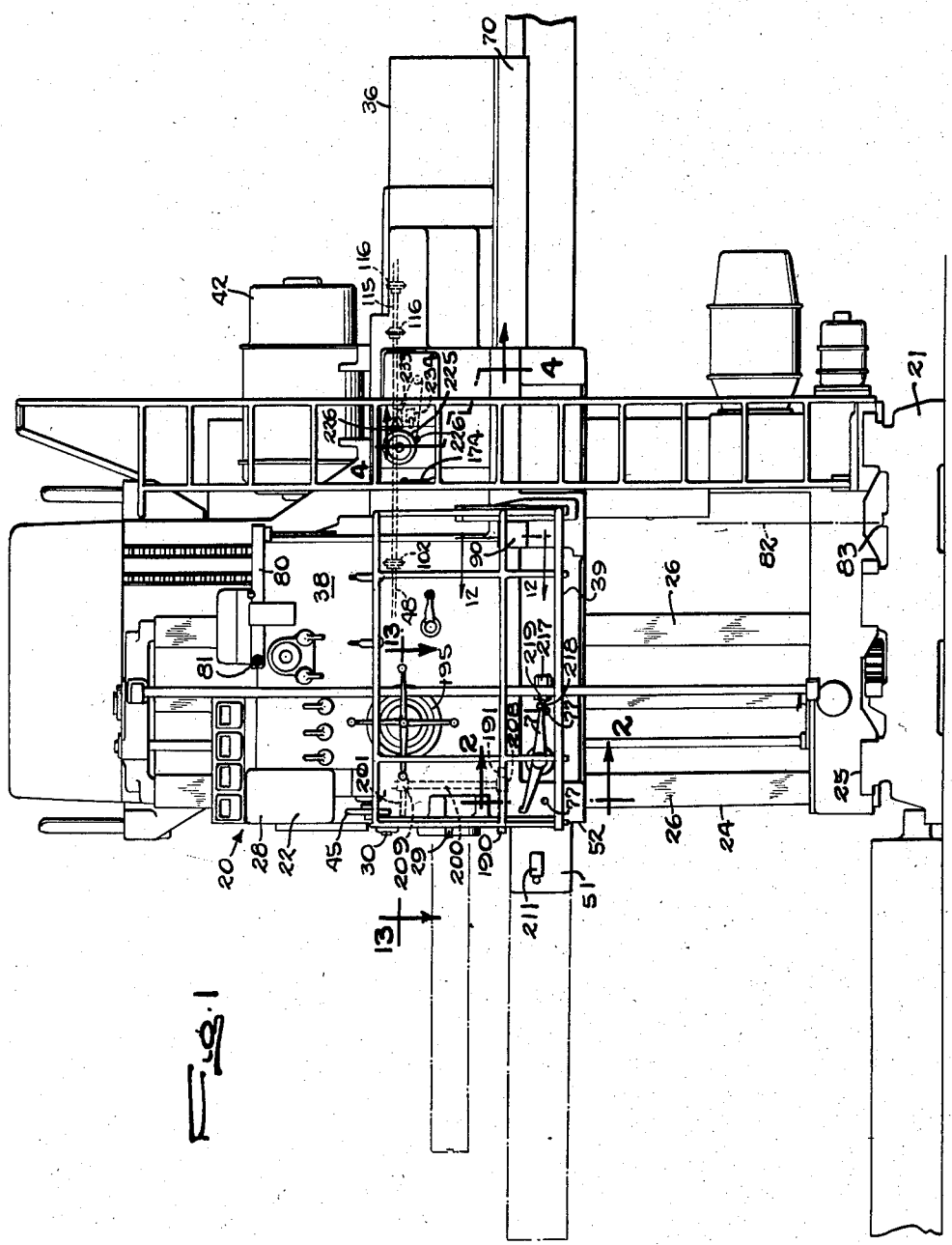

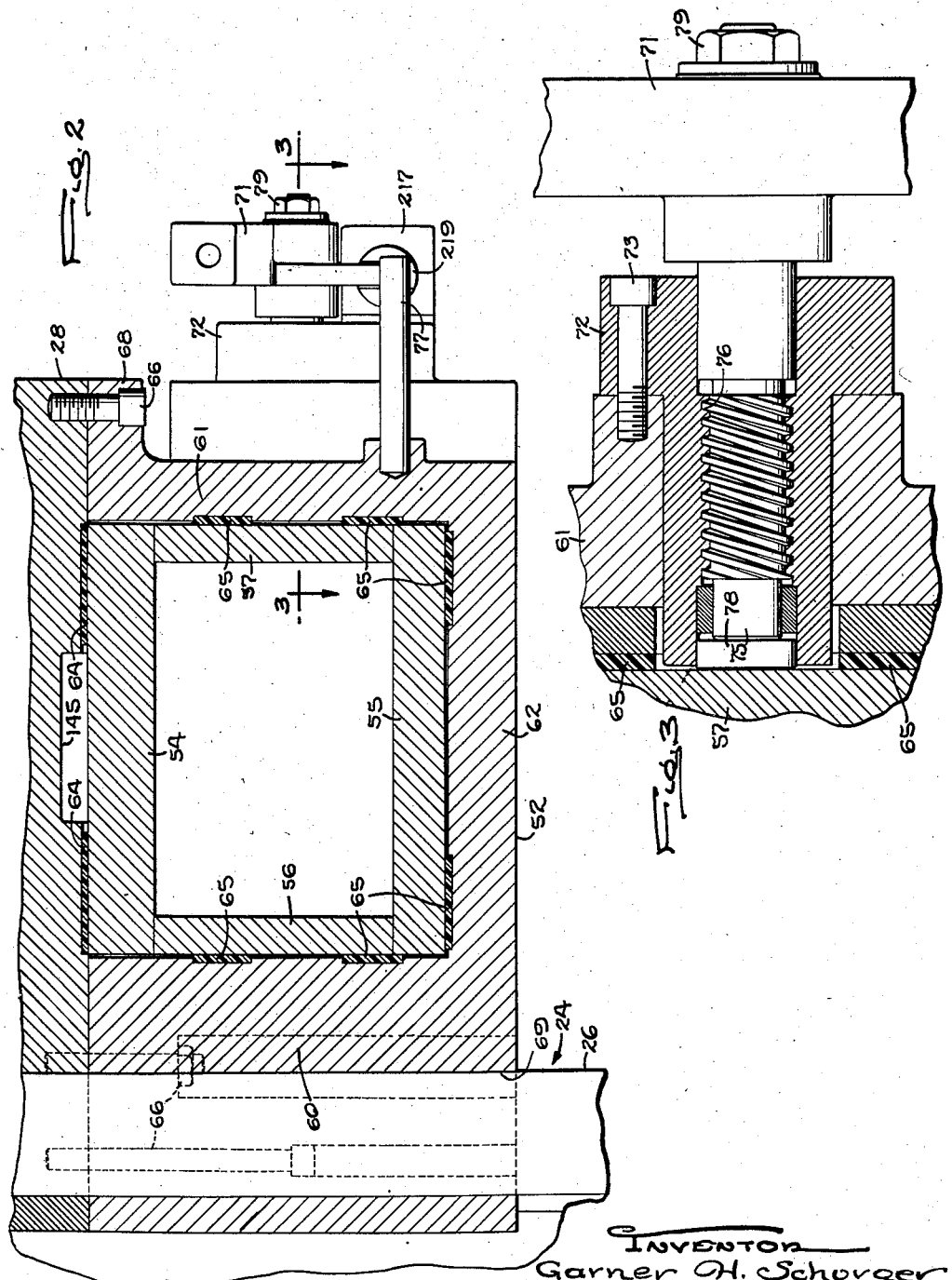

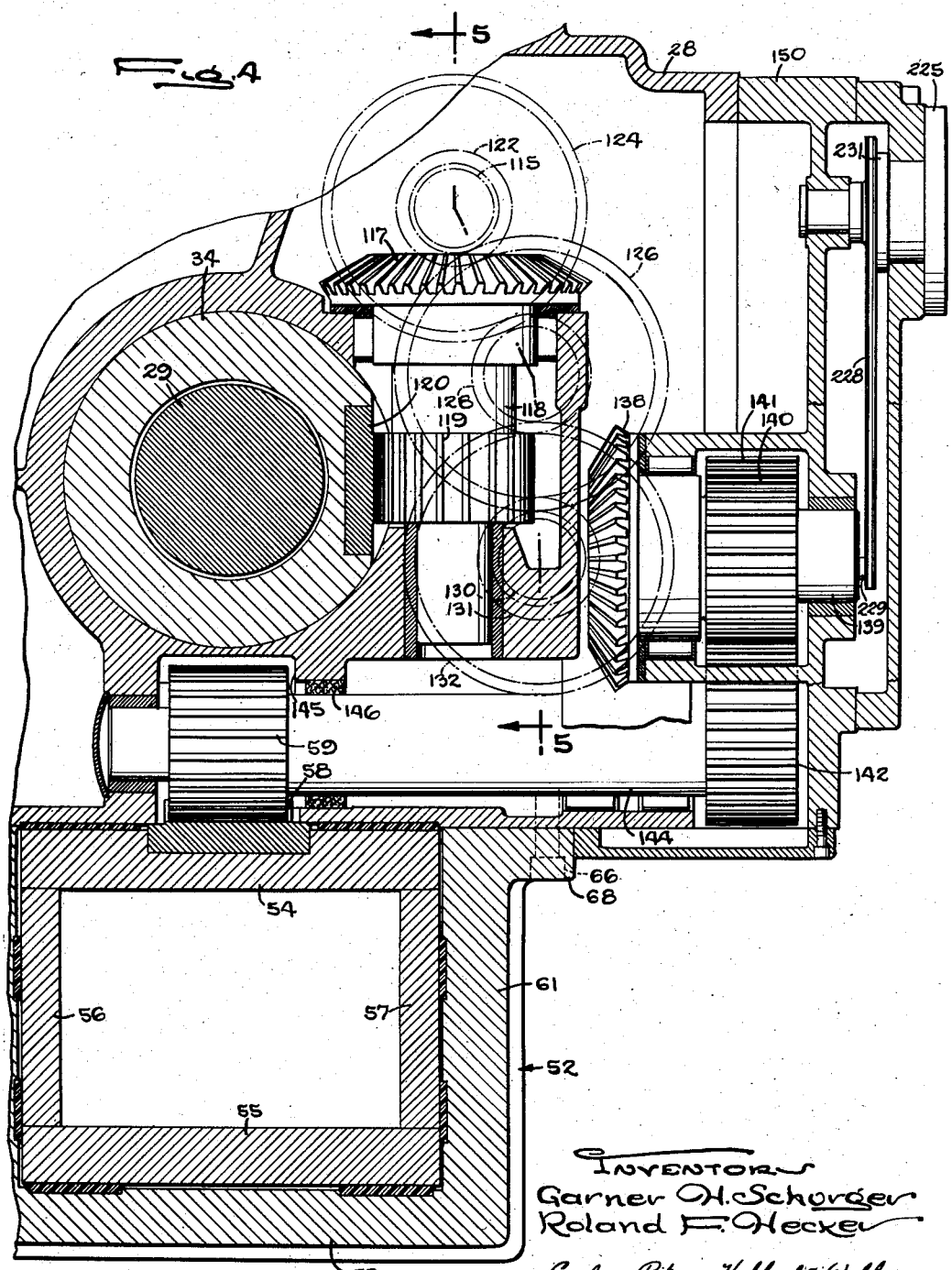

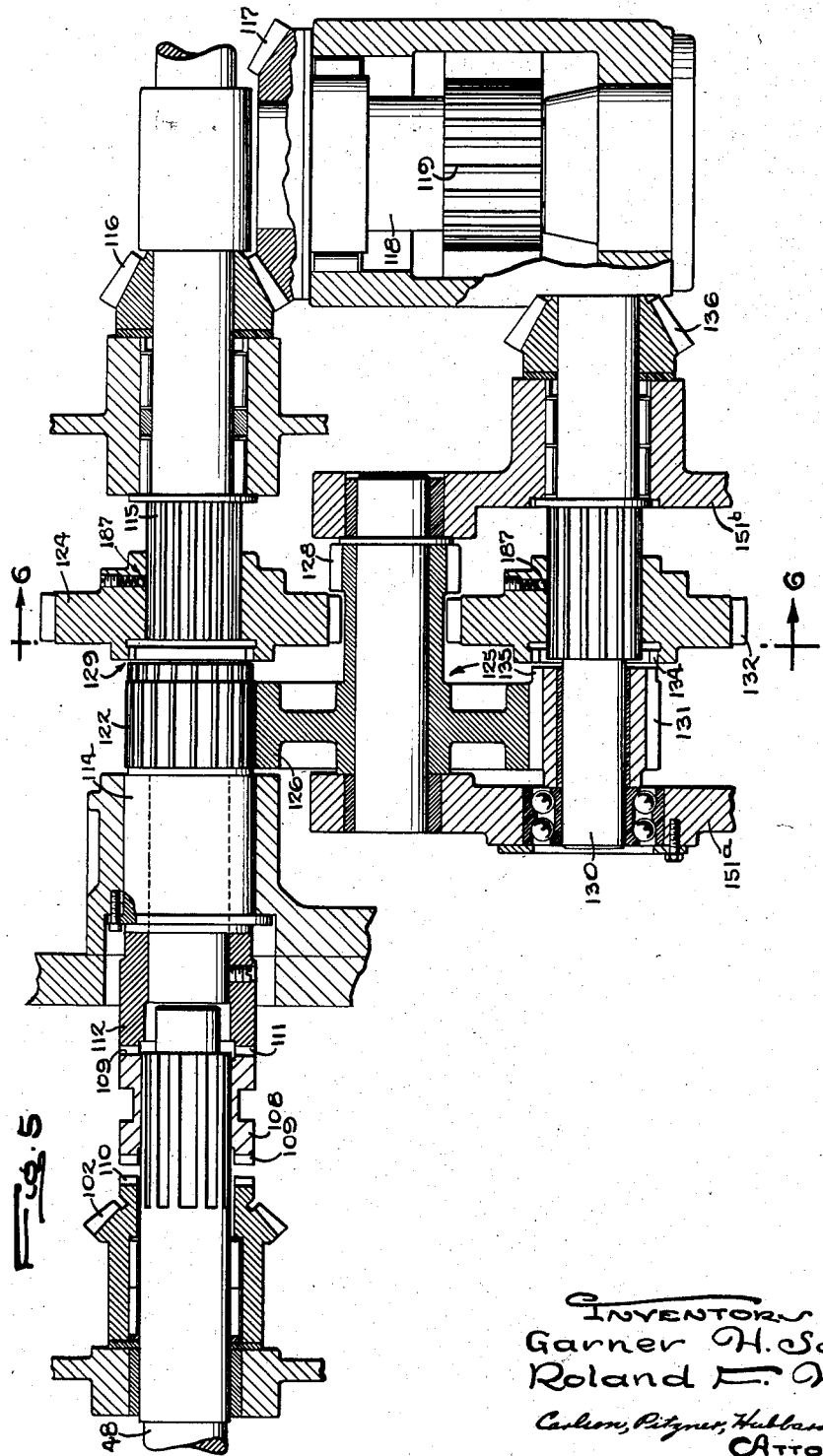

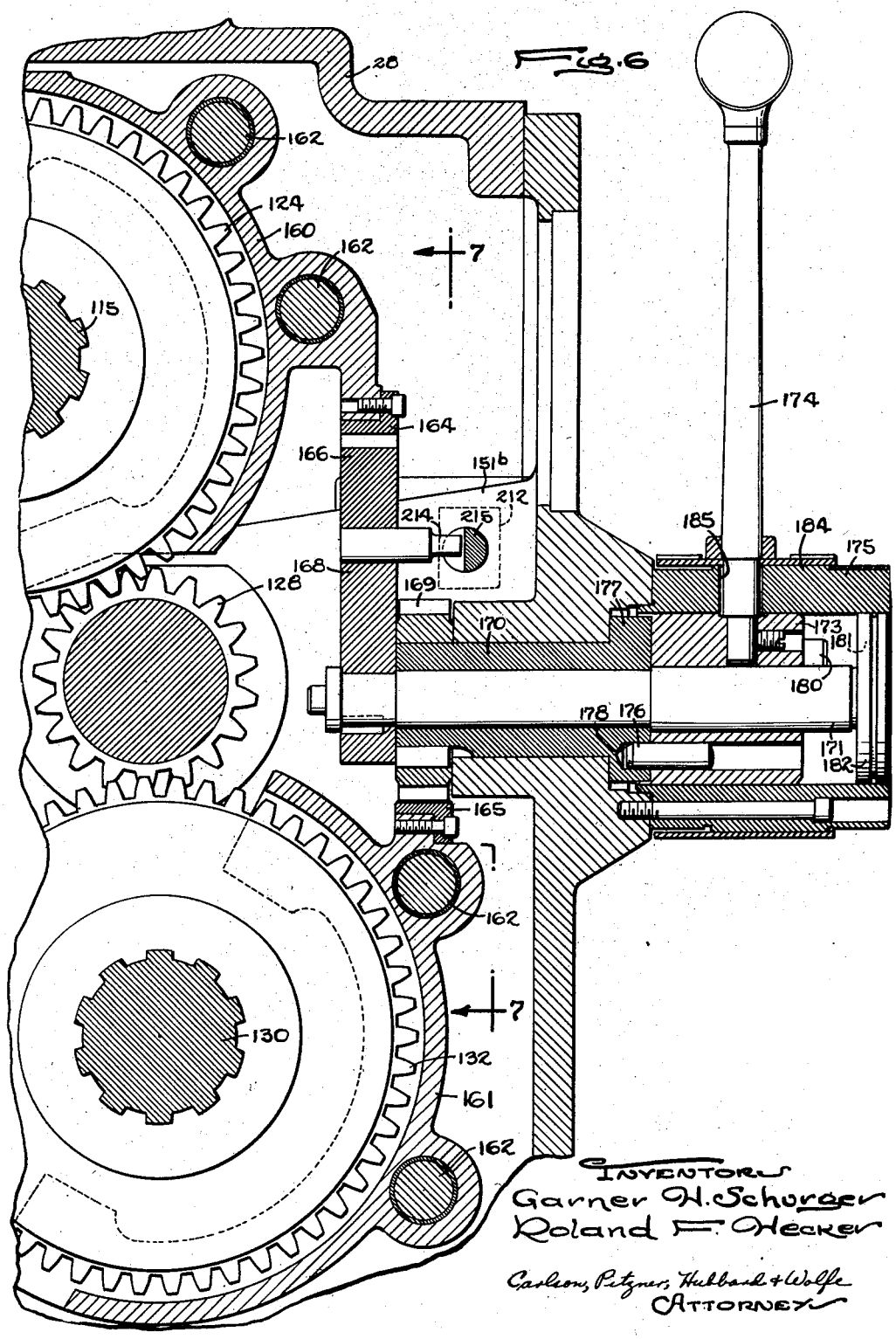

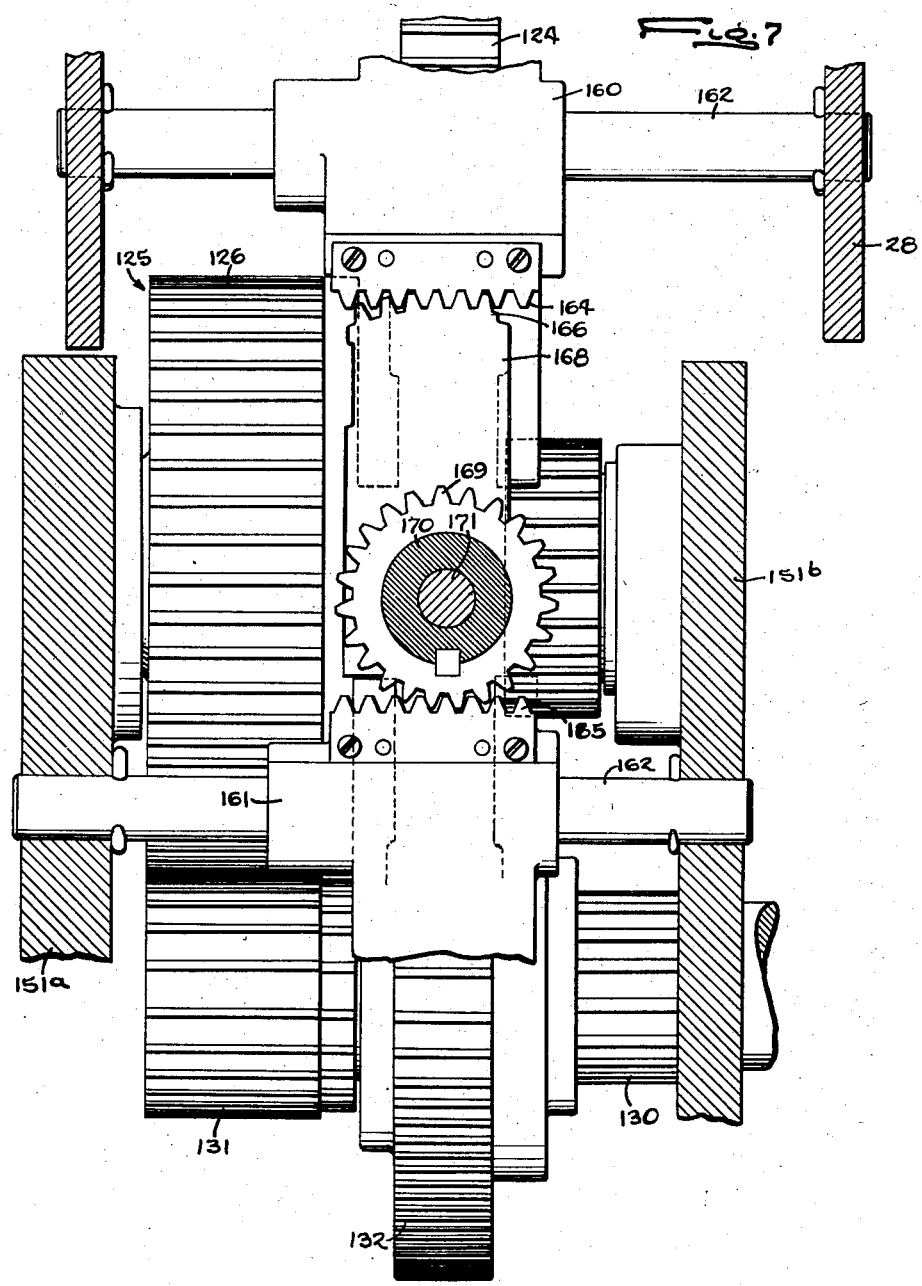

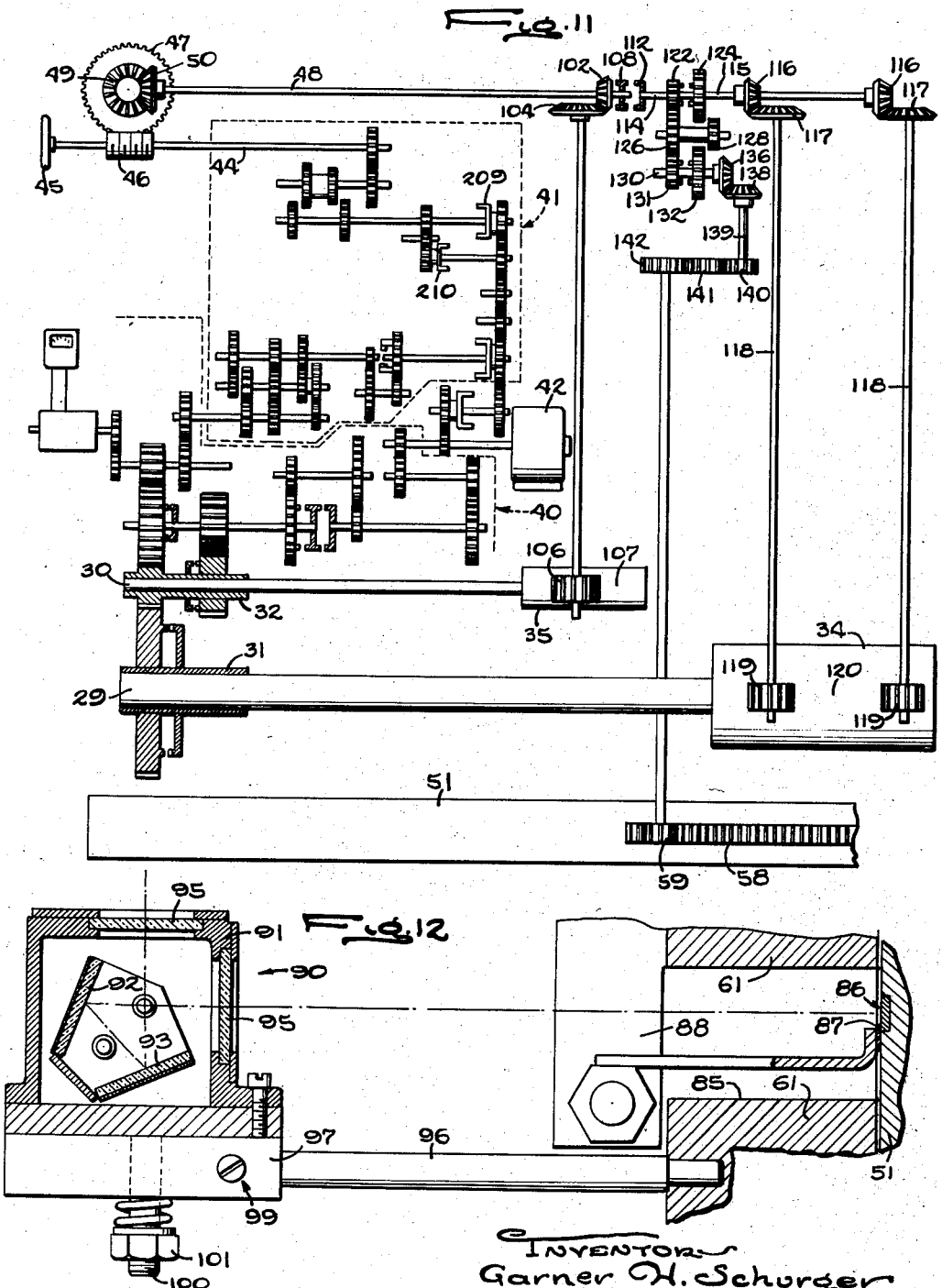

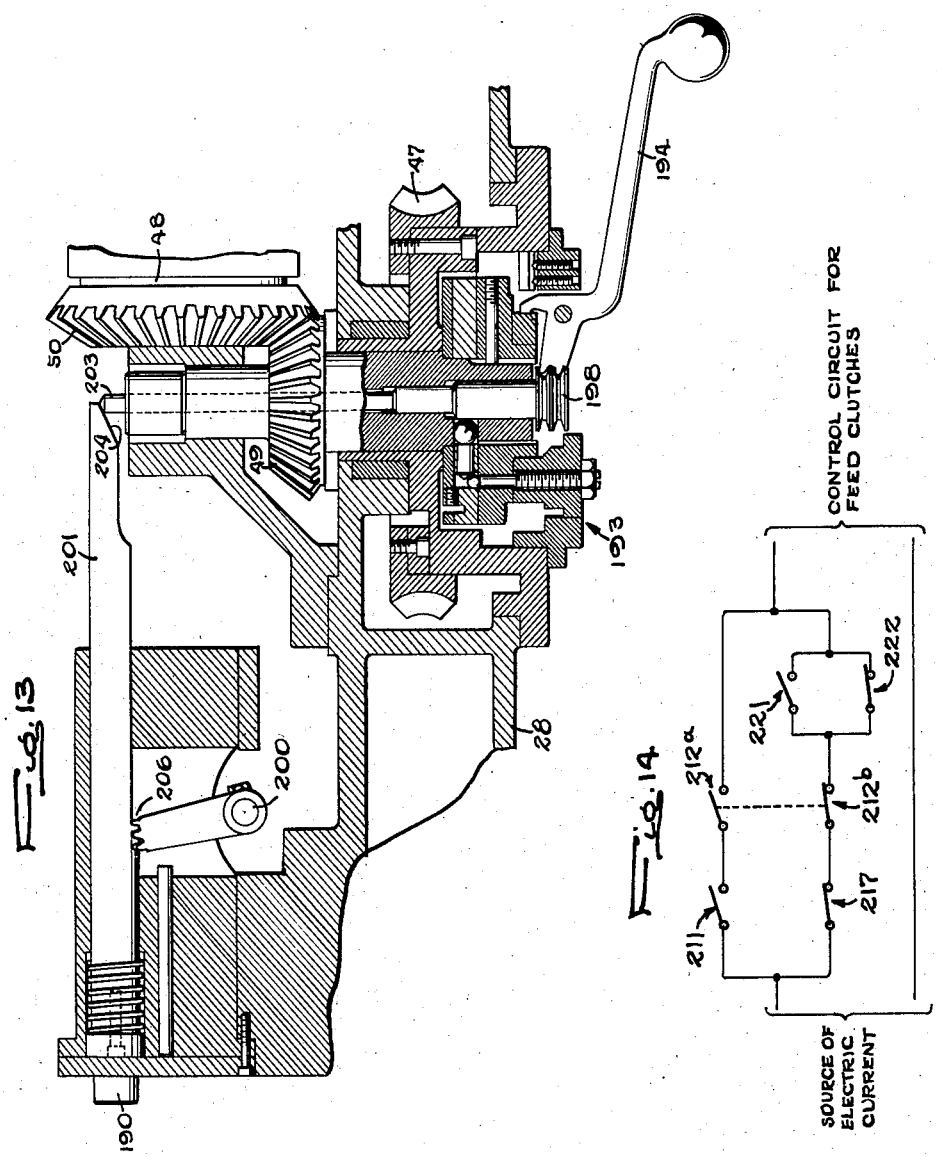

United States Patent Office 2,890,629
Patented June 16, 1959

2,890,629

MACHINE TOOL

Garner H. Schurger and Roland F. Hecker, Fond du Lac, Wis., assignors to Giddings & Lewis Machine Tool Company, Fond du Lac, Wis., a corporation of Wisconsin Application December 1, 1953, Serial No. 395,464

8 Claims. (Cl. 90—16)

The present invention relates to improvements in machine tools and in particular to an improved headstock and underarm support mechanism for machine tools in general and especially adapted for use with machine tools of the type known as horizontal boring, drilling and milling machines.

It is a general aim of the present invention to provide an improved and novel underarm support mechanism for machine tools which permits greater accuracy of machining operations and a wider range of useful machining operations.

Another object of the invention is to provide an improved underarm support mechanism which is capable of being translated in parallel with a relatively driven spindle of a machine tool to provide support for such spindle or for use independently of such spindle for machining operations not requiring a rotatively driven tool. A related object is to provide an underarm support which is capable of stable and precision operation even under heavy loads and in extended positions outwardly of the headstock.

It is also an object of the invention to provide an underarm support which stabilizes the headstock of the machine tool against deflection and effectually eliminates any tendency of misalinement of the machine tool spindles due to the added weight of the underarm mechanism.

A further object of the present invention is to provide an underarm support mechanism which may be readily attached to machine tools of existing types and which has a compact feed mechanism permitting attachment to a machine tool without disturbing the feed transmission for the spindles of the machine tool.

It is another object of the present invention to provide an underarm support mechanism which is protected against inadvertent operation which would damage either the spindle or the underarm mechanism. A more detailed object of the present invention is to interlock the spindle and underarm feed mechanisms against improper operation. A related object of the invention is to provide an underarm mechanism which is protected against inadvertently feeding attachments or tools mounted on the underarm into the housing of the machine tool.

A further object of the present invention is the provision of an underarm support capable of being positioned with precision and being constructed to provide means for measuring the movement of the underarm conveniently and accurately.

Other objects and advantages will become apparent as the following description proceeds.

In the accompanying drawings,

Figure 1 is a front elevational view of a horizontal boring, drilling and milling machine of the type disclosed in the patent of K. F. Gallimore No. 2,251,015, issued July 29, 1941, but having a spindle headstock embodying the features of the present invention.

Fig. 2 is a fragmentary section taken along the line 2—2 of Fig. 1 showing the underarm construction.

Fig. 3 is a fragmentary section taken along the line 3—3 of Fig. 2 showing a detail view of the underarm clamping mechanism.

Fig. 4 is a fragmentary section taken along the line 4—4 of Fig. 1, showing a portion of the underarm feed mechanism.

Fig. 5 is a section taken along the line 5—5 of Fig. 4, showing a portion of the underarm and spindle feed mechanism.

Fig. 6 is a section taken along the line 6—6 of Fig. 5, showing the shift mechanism for the underarm and main spindle feed mechanism.

Fig. 7 is a section taken along the line 7—7 of Fig. 6 showing another portion of the shift mechanism for the underarm and main spindle feed mechanism.

Fig. 8 is an end view of the shift lever and support indicating the various shift positions.

Fig. 9 is a vertical section taken through the shift lever block for the feed mechanism of the main spindle and underarm.

Fig. 10 is a developed top view of the shift lever guide plate and cover.

Fig. 11 is a diagrammatic view of the gearing for driving the spindles and underarm in the exemplary machine tool shown in Fig. 1.

Fig. 12 is a vertical section of the measuring device for the underarm.

Fig. 13 is a section taken along the line 13—13 of Fig. 1, showing the safety knockout mechanism.

Fig. 14 is a simplified wiring diagram of the interlock mechanism for the main spindle and underarm.

While the invention is susceptible of various modifications and alternative constructions, the preferred embodiments will be described herein in detail, but it is to be understood that the invention is not to be limited to the specific form disclosed but the intention is to cover all modifications and alternative constructions falling within the spirit and scope of the invention, as expressed in the appended claims.

Referring more particularly to the drawings, it will be understood that the auxiliary or outboard supporting means constituting the present invention may be utilized with a translatable spindle in various types of machine tools. It is, however, especially useful and hence disclosed in connection with a spindle headstock of the type commonly employed in horizontal boring, drilling and milling machines, and in particular a machine tool of the type disclosed in United States Patent No. 2,251,015, issued to K. F. Gallimore on July 29, 1941.

The type of machine tool disclosed in said United States Patent No. 2,251,015 is illustrated at 20 in Fig. 1 of the drawings and comprises in general organization a machine tool bed or base 21 with a headstock 22 slidably supported thereon. A headstock column 24 is movable horizontally of the bed 21 on suitable ways 25 formed in the top surface on the latter. The headstock itself is mounted for vertical movement on guideways 26 formed on the side of the headstock column 24.

The headstock constituting the exemplary embodiment of the invention comprises a housing 28 having journaled therein for rotary drive and axial feed main and auxiliary spindles 29, 30. The spindles 29, 30 are supported for rotational drive in splined drive quills 31, 32, shown diagrammatically in Fig. 11, which are journaled in fixed positions within the housing 28. The rear ends of the spindles extend through and are journaled within cylindrical feed rams 34, 35 slidably supported in the housing. The feed ram 34 for the main spindle 29 extends rearwardly of the main portion of the headstock housing 28 into a ram guide housing 36.

The exemplary headstock also has a control panel on its outboard side, indicated generally at 38, and an operating platform 39 slightly below its lower surface. Contained within the headstock housing is the speed change gearing for rotating and feeding the spindles. Any suitable speed gearing may be used for rotatively driving the quills 31, 32, such for example, as that shown diagrammatically in Fig. 11 within the area set apart by a dotted line and indicated generally by the reference numeral 40. The speed change gearing there shown does not form a part of the present invention, and for a detailed description thereof reference may be made to said United States Letters Patent No. 2,251,015.

Within an area bounded by a similar dotted line, indicated generally by the reference numeral 41 in Fig. 11, is shown diagrammatically the speed change gearing for axially feeding the spindle rams, and the same is described in detail in said United States Letters Patent No. 2,251,-015. Suffice it to say for present purposes, a drive motor 42 mounted on the headstock housing 28 drives both the rotational gearing 40 and the feed gearing 41. In the case of the feed driving mechanism, the drive motor 42 operating through the speed change gearing 41 rotates a worm gear shaft 44 having a hand wheel 45 which is used for manually feeding the spindles. A worm gear 46 on the shaft 44 meshes with a worm gear wheel 47 which in turn drives an output shaft 48 through a pair of bevel gears 49, 50. As seen in Fig. 1 of the drawings the output shaft 48 which feeds the spindles by gearing to be described hereinafter, extends longitudinally of the headstock housing 28 adjacent the spindles 29, 30 and projects rearwardly into the main spindle ram guide housing 36.

In the exemplary headstock described herein, the spindles 29, 30 are disposed in substantially horizontal positions and the front end of each is appropriately shaped for drive connection with suitable tools, tool holding fixtures or attachments. The present invention contemplates a novel outboard support for the spindles, particularly the main spindle 29, while using the latter for driving a tool in machining operations which require rotation of the tool as in milling and boring operations. An outboard support, or underarm support, embodying the features of the present invention is also particularly adapted for machining operations which involve simple translation of a tool without rotation, such as planing and shaping operations. In the latter instance, the desired tool may be attached directly to the underarm support by any suitable attaching means.

In practicing the present invention, an underarm support means providing greater precision of machining and a wider range of application is utilized. To accomplish this, the exemplary headstock 22 is provided with an underarm 51 and an underarm support housing 52. In the preferred form illustrated in the drawings, the underarm 51 is positioned immediately under the headstock housing 28 and extends substantially horizontal in parallel relation to the spindles 29, 30.

The underarm 51 is of generally rectangular cross section being formed by a pair of top and bottom plates 54, 55 and a pair of side plates 56, 57. The plates forming the walls of the underarm are bolted or otherwise suitably fastened together in the desired rectangular shape. In length, the underarm preferably is substantially longer than the headstock housing 28 so that the underarm may be translated to a forwardly projecting position at least equal to that of the main spindle 29 and still have its rearward end portion supported in the support housing 52. The upper face of the top plate of the underarm carries a gear rack 58 which is engaged by a pinion 59 for translating the underarm in a working cycle forwardly and rearwardly relative to the headstock.

The underarm support is constructed to provide bearing support against deflection of the underarm in both vertical and horizontal directions. For this purpose the underarm support housing 52 is of U-shaped, or yoke construction, which when attached to the underside of the headstock housing forms a rectangular bearing support. There are thus provided four bearing faces to support the underarm, the top surface of the arm being in bearing contact with the underside of the headstock housing, and the side and bottom surfaces being in bearing contact with the inner surfaces of the legs 60, 61 and bottom 62 of the support housing. On each of the bearing surfaces of the support, there may be provided, if desired, longitudinally extending strips 64 of bearing material which preferably are of the non-metallic type. In the illustrated housing the underside of the housing is provided with such bearing materials. Also, it is desirable to provide adjustable bearing surfaces in the form of adjustable gibs on certain of the bearing faces of the housing such as at 65 on the forward and rear end portions of the bearing faces of the support housing as shown best in Fig. 2 to insure accurately spaced bearing surfaces and to take up for wear to maintain the desired spacing. Suitable longitudinal grooves may be provided in the inner faces of the legs 60, 61 and bottom 62 of the support housing to receive the bearing strips 65.

For simplicity and low cost construction, the support housing 52 is constructed as a unit separate from the headstock housing 28. By this arrangement, it is merely necessary to machine the lower surface of the casting which forms the headstock housing to receive the underarm assembly. The same headstock casting may thus be used with or without the underarm assembly as may be desired for a particular installation. To receive the underarm housing, the underside of the headstock housing is machined to provide bearing surfaces for the top of the underarm, and to receive attaching fasteners, such as bolts 66, which pass upwardly through the underarm support housing 52 or through side flanges 68 provided thereon.

Means are also provided for supporting the underarm assembly in a manner partially independent of the headstock housing. For this purpose, the inboard side portion or leg 60 of the underarm housing 52 has a lateral extension to engage the vertical column guideways 26. The external surfaces of the lateral extension are provided with way bearing faces 69 which are in alinement with corresponding ways on the headstock housing forming continuations or extensions of the latter. Thus the overhanging weight of the underarm assembly is partially carried by its own set of bearing surfaces 69. The underarm housing ways give support not only for the underarm but also provide added guiding surfaces for the headstock itself.

In addition to the foregoing provisions for supporting and guiding the headstock and underarm for increased precision of machining operations, it has been discovered that the accuracy of work is improved by divorcing the rear, overhanging end portion of the underarm 51 from the main spindle ram housing 36. Heretofore, the underarm support means has been attached to the headstock housing 28 and to the rearwardly projecting spindle ram housing 36 which provided support for the underarm for substantially its entire length when in retracted position. In the present instance, however, the underarm support housing 52 is made substantially co-extensive in length with the main portion of the headstock housing 28, terminating a short distance behind the headstock housing and leaving substantially the entire rearwardly overhanging end portion of the spindle ram housing 36 independent of the underarm housing. It has been found that this construction not only improves the accuracy of alinement of the underarm 51, but also of the main spindle 29. With the present construction, the tendency of the forward end of the main spindle to be deflected upwardly when the underarm is in retracted position is obviated. The accuracy of alinement of the underarm is improved due to the weight of the freely suspended rear end portion of the underarm which tends to balance the weight of the forward end portion and reduce downward tilting or sag of the latter when the underarm is fed outwardly to a working position.

In connection with the foregoing construction means are provided to protect the machined bearing surfaces of the underarm when the latter is in its retracted positions. As seen in Fig. 1, inverted channel members 70 of sheet metal are positioned over the top and sides of the underarm in spaced relation thereto. The channel members 70 are connected at their forward ends to the headstock housing 28 in any suitable manner and thus provide a shield to protect the underarm surfaces from dirt and from damage due to falling objects which otherwise may be dropped directly on the underarm.

Means are also provided for maintaining the underarm 51 in any desired axial position by clamping the same to its support housing. For this purpose a foot treadle 71 is conveniently located for foot actuation by an operator on the headstock platform 39, or for hand operation by an operator standing on the working floor. In the second instance, it may be convenient to provide an extension handle (not shown) which is fixed to the treadle and extends over the edge of the headstock platform. The treadle 71 is supported by a flanged sleeve 72 which is received in a transverse hole in the outboard side 61 of the U-shaped underarm support housing 52, preferably adjacent the forward end of the housing. The sleeve 72 is suitably fastened to the side of the housing 52 as by bolts 73 passing through the flange portion of the sleeve. A clamping bolt 75 is received in a threaded bore 76 in the sleeve. In abutting engagement with the inner end of the clamping bolt 75 is a cylindrical clamp shoe 78 slidably received in the inner end of the sleeve 72. The foot treadle 71 is securely fixed centrally of its length to the outwardly projecting end portion of the clamping bolt 75 by a threaded nut 79. Stop pins 77 projecting from the side of the underarm housing may be provided to limit the swing of the treadle to clamped and unclamped positions. Thus by stepping on the front end portion of the treadle the clamping bolt is screwed inwardly forcing the clamping shoe against the side of the underarm 51, clamping the same in position. Conversely, stepping on the rear end portion of the treadle unclamps the underarm, loosening the arm for axial translation.

The present underarm support housing 52 is particularly well adapted for the use of a telescopic sight for measuring the feeding movement of the underarm. By means of a novel sighting means and vernier scales the position of the underarm may be measured by use of a telescopic sighting device such as that described in detail in United States Patent No. 2,376,303 issued to R. M. Woytych, on May 15, 1945. The telescopic measuring device there described comprises an adjustable telescope attached to the headstock housing at a height convenient to an operator standing on the operating plaform and has a vertical line of sight to a horizontal scale on the bed thus providing a convenient and precise means of positioning the headstock column along the runway. In the present exemplary construction a horizontal type telescope 80 is mounted on the headstock housing having an eyepiece 81 adjacent one end and providing a vertical line of sight 82 adjacent its other end to a scale 83 on the machine tool bed.

By the present arrangement this telescopic measuring device 80 may be used alternatively for measuring the position of the headstock column 24 and of the underarm 51. For this purpose, the underarm housing has a cutout portion 85 adjacent the upper edge of the outer leg 61 and in vertical fore and aft alinement with the telescope 80 mounted on the headstock housing. A measuring scale 86 is provided on the underarm 51 so that the same can be seen through the cutout portion of the underarm housing 52. A vernier scale 87 is mounted on the housing adjacent the underarm scale by means of a support block 88 for cooperating with the scale on the underarm. The vernier scale 87 may if desired be adjustably mounted for fine adjustment longitudinally of the underarm. Direct reading of the vernier scale is highly inconvenient since its position is within a few inches of the operating platform which would require the operator to kneel and bend over to see the scale. For utilizing the telescope 80 to read the underarm scales, a right angle sight device 90, alined with the underarm scales is provided. The sighting device 90 comprises a housing 91 having a pair of angled mirrors 92, 93 of the first-surface type. The mirrors are positioned at approximately 67½° relative to the vertical and horizontal axes respectively, so that horizontally directed light is reflected between the mirrors and upwardly in a vertical direction. Suitable transparent covers 95 are provided for the top and inboard sides of the housing 91 to protect the mirrors.

To permit the use of the telescope 80 for positioning of both the headstock column and the underarm, the right angle sighting device is mounted for sliding movement into and out of the vertical line of sight 82 of the telescope. To accomplish this the right angle device 90 is slidably mounted on a pair of parallel horizontal rods 96 fixed to and projecting outwardly from the side of the underarm housing. The rods are received in suitably spaced holes in a base plate 97 supporting the right angle device housing and a spring biased detent 99 is provided in the base plate to position the right angle device housing in vertical alinement with the telescope. When a measurement is required for the column runway, it is merely necessary for the operator to push the right angle device 90 inwardly along the support rods out of the vertical line of sight 82. When a measurement on the underarm is desired, the right angle device is pulled outwardly into the line of sight as determined by the detent. For adjusting the vernier scale 87, it is desirable to have the right angle device mounted for pivoting about a vertical axis so that both the central and end portions of the scales may be read. To this end, the housing 91 for the mirrors is pivotally mounted on the base plate about a vertical axis by means of a depending pivot pin 100 which is threaded on its lower end to receive a tightening nut 101.

Further in accordance with the present invention, means are provided for axially translating the underarm 51 either by hand or by power independently of the main spindle 29. More specifically the invention contemplates the application of manual or power feed to either the main spindle or to the underarm as may be desired by the operator. When simultaneous translation or feed of the spindle and underarm is desired, the underarm is engaged to the feed mechanism and the spindle is pulled along by any suitable attachment (not shown) interconnecting the forward end portions of the underarm and spindle. The foregoing is accomplished by a novel arrangement which provides for simple, yet flexible, operation of the machine tool, and minimizes the operations required to adapt a headstock, such as that shown and described in the aforesaid United States Patent No. 2,251,015, for incorporation of the underarm.

Referring to Fig. 1 of the drawings it will be noted that the output drive shaft 48 of the feed gearing, as previously described, extends longitudinally of the headstock housing in the vicinity of the main and auxiliary spindles. As more fully described in said United States Patent No. 2,251,015, the drive shaft 48 has adjacent its rear end, a bevel gear 102 freely journaled thereon. As shown diagrammatically in Fig. 11, the bevel gear meshes with a mating bevel gear 104 which in turn is drivingly connected by a shaft 105 to a spur gear 106 engaging a rack 107 on the auxiliary spindle ram 35 to translate the auxiliary spindle 30. An axial slidable, three position clutch 108 having clutch teeth 109 on its respective end faces is splined to the output shaft 48 for rotation therewith. In its central position, the clutch 108 is in neutral, and in its left hand position, see Fig. 5, it engages mating clutch teeth 110 on the bevel gear 102 for feeding the auxiliary spindle 30. In its right hand position the clutch 108 engages mating clutch teeth 111 on a clutch sleeve 112 which is fast to a coaxial power shaft 114 for translating the main spindle ram 34. At the outer end of an extension of the coaxial power shaft 114 are a spaced pair of bevel gears 116 (see Figs. 5 and 11). These bevel gears 116 each mesh with mating bevel gears 117 on depending stub shafts 118 which in turn have spur gears 119 engaging a common rack 120 on the main spindle feed ram 34.

By means of the present arrangement, the desired feed drive for the underarm 51 and main spindle 29 is accomplished by interrupting the main spindle feed drive shaft and interposing therein power take off means for the underarm feed and shiftable gearing adapted to control both the main spindle and underarm feeds. To this end the coaxial drive shaft 114 for the main spindle is severed separating therefrom an alined extension shaft 115 which carries the bevel gears 116 driving the main spindle ram 34. Fixed on the severed end of the drive shaft 114 is a pinion gear 122, and splined to the adjacent end portion of the extension shaft 115 is a slidable clutch gear 124. Associated with these two gears 122, 124 is a change speed gear train which provides alternative driving connections to the main spindle ram and the underarm with either a direct or a reduced speed driving connection, which in the present embodiment of the invention is either a 1:1 or a 1:6 drive ratio. The latter ratio is provided to facilitate manual feeding of the main spindle and underarm.

For the foregoing purpose, a gear cluster 125 having a first intermediate gear element 126 in constant mesh with the driving pinion 122 and a second intermediate gear element 128 engageable with the slidable clutch gear 124 is provided. The slidable clutch gear and driving pinion have mating clutch teeth 129 on their facing ends so that moving the slidable gear 124 from a central neutral position to its left hand position, as shown in Fig. 5, provides a direct feed drive to the spur gear 119 and rack 120 for the main spindle 29. Moving the slidable gear 124 to its right of center position causes it to mesh with the second intermediate gear 128 on the gear cluster 125 giving a reduced speed drive to the extension shaft 115 through gears 122, 126, 128 and 124.

To feed the underarm, a stub shaft 130, carrying a freely rotatable pinion 131, is mounted parallel to the intermediate gear cluster 125 and with the pinion 131 in constant mesh with the first intermediate gear element 126. Also mounted on the stub shaft 130 is an axially slidable clutch gear 132 splined to the stub shaft for rotation therewith. The slidable gear 132 has a set of clutch teeth 134 on its end face adjacent the freely rotatable pinion 131 and when moved to left of its center neutral position, the clutch teeth 134 engage mating teeth 135 on the end face of the pinion 131 to establish a 1:1 drive ratio between the drive shaft and the underarm gearing. In its right of center position, the slidable gear 132 meshes with the second intermediate gear 128 on the gear cluster 125 to provide a reduced speed drive to the underarm feed gearing. A bevel gear 136 secured to the rear end portion of the stub shaft 130 meshes with a mating bevel gear 138 fixed on a horizontal stub shaft 139 which in turn carries the first 140 of a series of three meshing pinions 140, 141, 142. The last pinion 142 in the series is suitably fixed to a shaft 144 which extends horizontally inwardly over the underarm 51. The inner end portion of this shaft carries a rack pinion 59 which meshes with the gear rack 58 fixed to the upper side of the underarm 51 for translating the same.

To summarize the foregoing gear arrangement for driving the underarm, a 1:1 feed drive is obtained by shifting the slidable gear 132 to its left hand position to provide a drive through gears 122, 126, 131 and 132 to the driving bevel gear. For this purpose, the drive pinion 122 and the clutch pinion 131 are of the same size. In its right hand shift position, the slidable gear provides a reduced ratio drive which in the present instance is 1:6 through gears 122, 126, 128 and 132 to the driving bevel gear.

As best seen in Fig. 4, the pinion gear 59 meshing with the underarm gear rack 58 is positioned in a pocket 145 formed in the underside of the headstock housing 28 and consequently is located externally of the housing and gearing enclosure. Oil leakage from the housing and gearing through the pocket is prevented by providing a suitable oil seal 146 about the shaft 144 adjacent its entrance to the pocket.

In the preferred embodiment, a cover plate 150, attached to the side of the headstock housing in overlying relation to the previously described main spindle and underarm ram feed transmissions, is provided. This cover plate 150 provides easy access through an opening in the side of the headstock housing for inspection or servicing of the gearing, and further provides a novel means for supporting the underarm drive gearing. Referring to Figs. 4, 5 and 6 of the drawings, it will be seen that the cover plate 150 is bolted to machined edge surfaces of the opening in the side of the headstock housing. Projecting inwardly from the inner face of the coverplate are suitably shaped ribs 151a, 151b for supporting the drive gearing for the underarm, including the shafts carrying the intermediate gear cluster 125, and the slidable gear assembly (131, 132, 136). Mounted directly on the coverplate are stub shafts carrying the bevel gear 138 and the first and second ones 140, 141 of the series of pinion gears. It will be seen that there are but three points of contact or engagement between the gearing mounted in the headstock and the transmission gearing mounted on the coverplate. These points of engagement are between the drive pinion 122 and the first intermediate gear 126, between the slidable gear 124 and the second intermediate gear 128, between the pinion 142 on the underarm drive shaft 144 and the second or idler pinion 141. Each of these connections is made automatically when the coverplate is moved inwardly toward the headstock housing over the opening. Thus a convenient and simple supporting means is provided for the underarm driving gears which permits the latter to be assembled with or removed from the headstock at will.

Also mounted on the coverplate is a gear shifting mechanism for shifting the slidable gears to effect feeding of the main spindle ram 34 or alternatively of the underarm at the normal 1:1 ratio or reduced ratio of 1:6. Shifting of the slidable gears 124, 132 is accomplished by means of arcuate channel shaped shifter shoes 160, 161 which overlie a portion of the periphery of the slidable gears 124, 132 and engage the sides of the latter. The shifter shoes are slidably supported for translation on sets of shifter rods 162, and each shoe has a horizontally disposed gear rack 164, 165. The racks 164, 165 are offset vertically from each other, the rack 165 for the underarm in the outermost position. Engaging the upper gear rack 164 for the spindle shifter shoe is a gear segment 166 on the end of an upright arm 168. The gear rack 165 for the underarm shifter shoe is engaged by a gear pinion 169. The shifter pinion 169 is fixed to a sleeve 170 which is journaled in the cover plate 150, while a concentric shaft 171 extending through the sleeve has the upright shifter arm 168 fixed to its inner end portion, so that the gear arm and the pinion both swing about a common axis.

Slidably and rotatably mounted on an outwardly projecting end portion of the gear arm shaft 171 is a cylindrical shifter block 173 which carries a shift lever 174. The shifter block is also slidably and rotatably journaled in a surrounding cylindrical casing 175 fixed to the out-side of the cover plate 150. Means are provided in the form of a pair of inwardly projecting pins 176 on the shifter block 173 for connecting the latter to a flange 177 on the shifter pinion supporting sleeve 170. The flange 177 has suitably spaced holes 178 to receive the projecting pins so that upon pushing the shift lever 174 toward the coverplate 150, the shifter block 173 engages the shifter pinion sleeve 170. When the shift lever 174 is then rocked from side to side the shifter pinion 169 moves in unison and operating on its associated gear rack 165 moves the slidable gear 132 for the underarm drive to any one of its three shift positions. In the same manner, a pair of pins 180 on the outer end face of the shifter block are movable into a corresponding pair of holes 181 in a disk 182 fixed to the end of the central shifter shaft 171 for shifting the spindle drive. Thus by pulling the shift lever 174 outwardly and rocking it from side to side, the central shifter shaft 171 and upright shifter arm 168 are rocked in unison to move the slidable gear 124 for the spindle drive along the shifter rods to any one of its three positions.

As seen in Fig. 10, a guide means for the shift lever 174 is provided in the form of a guide plate 184 formed on the upper side of the shifter block support casing 175. The guide plate 184 has an H-shaped slot arrangement 185 in which the end of each leg of the H is an engaged gear shift position, and the center bar of the H is the neutral position. Thus in order to change from the spindle drive to the underarm drive or vice versa, it is necessary that one of the drives be moved to neutral position before the shift lever can be moved to engage the other of the drives. In order to maintain the slidable gears in neutral position until forcibly moved therefrom by the shift lever, the slidable gears 124, 132 are held in their central positions by releasable spring biased detents 187 which engage suitably shaped depressions in the respective slidable gear shafts 95, 130. Thus a gear moved to neutral position will remain in that position until intentionally moved to an engaged position by the machine operator.

In the use of certain attachments on the forward end portion of the underarm 51, the usual forms of limit devices provided on machines of the present type have been found to be ineffective in some instances to prevent the attachment being fed inadvertently into the face of the headstock housing 28. Since these attachments may be positioned on the underarm at some distance from the forward or outer end of the arm, they may be forced inwardly against the headstock housing well in advance of the actuation of the usual safety limit devices. Provision is therefore made for disengaging the driving connection to the underarm upon inward feed to prevent jamming attachments on the arm into the headstock housing 28.

To accomplish this, a safety knockout pin 190 is mounted on the forward end face of the headstock housing 28 adjacent the upper side of the underarm 51, and is positioned to project forwardly from the end face of the housing 28 for a short distance to intercept an inwardly moving attachment on the underarm before the attachment moves into contact with the housing. The knockout pin 190 is slidably received in a suitable bore 191 in the headstock housing 28, and preferably is spring biased into its outwardly projecting position.

Means are provided for utilizing the rearward sliding movement of the knockout pin 190 upon engagement by an underarm attachment for releasing the feed drive to the underarm 51. In the preferred embodiment of the invention, the relative movement is used to operate a feed clutch 193 interposed between the worm gear wheel 41 and the bevel gear 49. The details of the clutch 193 are disclosed in the aforesaid United States Patent No. 2,251,015. These details of construction are not material here except to note that the clutch 193 is ordinarily operated by pivotally mounted quadrant handles 194 of a pilot wheel 195 mounted on the headstock control panel. The handles 194 are pushed or pulled toward and from the control panel to actuate an axially slidable operator rod 198 positioned centrally of the pilot wheel 195 for engaging or disengaging the clutch. Outward axial movement of the operator rod 198 causes the clutch to disengage the driving connection for feeding the spindles and underarm.

Interconnecting the knockout pin 190 and the clutch operator rod 198 is a vertical rock shaft 200 and a cam rod 201, the latter is mounted for horizontal sliding movement adjacent the upper end portion of the rock shaft 200 and in vertical alinement with the clutch operator rod 198. An inwardly projecting extension rod 203 abuts against the inner end of the operator rod 198 and the inwardly projecting end of the extension 203 is engaged by an inclined cam surface 204 on the rear end portion of the cam rod 201. Thus pushing the cam rod 201 rearwardly causes the inclined cam surface 204 to force the clutch operator rod 198 outwardly disengaging the clutch. Sliding movement is imparted to the cam rod 201 by a rack and gear connection 206 between its forward end portion and the upper end portion of the rock shaft 200. The rock shaft 200 in turn is rotated by means of a similar rack and gear connection 208 between its lower end portion and the rear end portion of the knockout pin 190. Thus an incoming attachment on the underarm, upon engagement with the knockout pin 190, will force the latter axially inwardly and cause the rock shaft 200 to rotate slightly. This rotary movement of the rock shaft 200 is transmitted through the rack and gear connection 206 to the cam rod 201 forcing the cam rod rearwardly. The cam surface 204 on the rear end portion of the cam rod 201 engages the projecting end of the clutch operator rod extension 203 and cams the latter outwardly to disengage the feed to the spindles and underarm.

Means are also provided for interlocking and controlling the relative operation of the underarm 51 and main spindle 29. For this purpose a novel arrangement of electrical limit switches is placed in series with an electrical circuit for controlling the feed drive clutches, such for example, as clutches 209, 210 in the reversing mechanism, of the machine. The details of the overall electrical circuit for controlling the machine tool are not a part of the present invention and a typical circuit for this purpose may be found in the said United States Patent No. 2,251,015, in which the clutches 209, 210 are engaged upon energization of electrical relays and solenoids. As shown in the simplified wiring diagram of Fig. 14, the present switch arrangement is placed in series with the electrical power circuit for such relays and solenoids.

One of the switches provided for interlocking the operation of the underarm 51 and main spindle 29, is arranged in one branch of a parallel switching circuit to prevent feeding of the main spindle when the latter and the underarm are interconnected for joint translation by any suitable attachment. The feed in this case is provided by the underarm drive mechanism alone. To accomplish this, a limit switch 211 of the normally closed type is mounted on the forward end portion of the underarm 51 in position to be opened when an interconnecting attachment is clamped or otherwise fixed to the underarm. With the attachment in place on the underarm, the circuit to engage the drive clutches is broken and the feed mechanism cannot be operated, unless the shift mechanism is actuated to engage the direct drive gear connection to the underarm, as will be described hereinafter.

Connected in series with the attachment limit switch 211 in the first branch of the switch circuit is one section 212a of a two section shift control switch 212 which is mounted on the coverplate 150 of the underarm transmission gearing. The two section switch 212 is operated by means of a stud 214 carried on the upright arm 168 of the feed shifting mechanism, and is of the type having a normally open section and a normally closed section. An axially movable actuator 215 of the shift switch is positioned to be engaged by the shifter arm stud 214 and is moved to close the first section 212a when the shifter arm is moved into the direct drive position for the main spindle 29. The second section 212b is simultaneously opened. In the direct drive position for the underarm 51, section 212a is open and 212b is closed. Thus to engage the drive clutches 209, 210 for operating the main spindle 29, the attachment switch 211 and the first section 212a of the shift switch 212 must be closed. This can be accomplished only with no interconnecting attachment on the underarm and with the feed shifter arm 168 in direct drive position for the spindle. If both of these conditions are not met no drive will be applied to either underarm or spindle.

To provide power feed for the spindle in both direct and reduced drive, a center operating type which mechanism is preferably employed. With such an operator mechanism, sections 212a, b are in one switch position at the midpoint of actuator travel, that is, neutral shift position, and are in their second position on either side of neutral to establish the same circuit connections for direct and reduced spindle feed drive.

In parallel connection with the foregoing series of switches is a second switching circuit which prevents feeding of the underarm 51 if the latter is clamped, or if the shift lever is not in position for direct feed drive to the underarm, or if the end limits of the underarm stroke have been reached. To accomplish these control operations, a limit switch 217 of the normally open type is positioned in interfering engagement with the clamp treadle 71. Adjacent the rear end portion of the latter a bevel surface 218 is provided on the rear end portion of the treadle for camming an axially movable actuator 219 on the switch 217 to closed position when the rear end portion of the treadle is moved downwardly in unclamped position. Thus when the forward end of the treadle is pushed downwardly to clamp the underarm, switch 217 is open interrupting the second branch of the switching circuit.

In series with the treadle clamp switch 217 is the second section 212b of the shifter switch 212 which is moved into closed position when the shift mechanism is shifted for direct drive feed to the underarm, as previously described. Also in the second branch of the switching circuit are two end limit switches 221, 222 which are arranged in parallel with each other, such that closing either of them completes a by-pass circuit around the other. Means controlled by the travel of the underarm are provided for actuating the end limit switches 221, 222 upon completion of a stroke of the underarm 51 in a given direction. This mechanism comprises a switch trip disk 225 mounted on the coverplate 150 of the underarm transmission gearing. The trip disk 225 is provided with a pair of trip dogs 226 which may be adjustably mounted for setting at predetermined angular positions about the disk 225. The various angular positions on the disk 225 represent positions of the underarm along its path of travel, the disk making approximately one revolution during the travel of the underarm 51 through its operative range of movement. The trip disk 225 is driven and coordinated with the travel of the underarm by means of a drive chain 228. The chain 228 is driven by a sprocket 229 on the stub shaft 230 on one of the idler pinions 141 mounted on the inside of the coverplate. The chain 228 in turn drives a sprocket 231 fast to the trip disk 225. The ratio of the two sprockets 231 is arranged to provide the desired correlation between underarm travel and disk rotation.

For cooperating with the trip disk, the end limit switches 221, 222 are mounted on the coverplate 150 and are provided with swinging actuators 233, 234 in the path of movement of the trip dogs 226 on the disk which open the respective switches upon contact with the trip dogs. On of the switches and a corresponding dog determine the limit of the outward stroke and the second switch and dog determine the limit of the inward stroke. Thus with one of the end limit switches closed (and the other open), the underarm will be fed in the direction determined by the closed switch until the end of the stroke is reached when the corresponding trip dog opens the switch and disengages the underarm drive. In the exemplary circuit arrangement illustrated in the drawings, a single cycle of underarm movement is provided and the underarm stops at the end of each direction of travel. If desired, however, the end limit switches may be of the double throw or double section type to effect an automatic reversing operation as by causing disengagement of one of the reversing clutches and engagement of the other of the reversing clutches.

To summarize the operation of the interlocking arrangement for the underarm and main spindle, it will be seen that the spindle 29 will not be driven if an interconnecting attachment is clamped to the underarm and thereby opening the attachment switch 211 and breaking the first branch of the switching circuit. Moving the shift lever to drive the spindle will not cause such operation since the second section 212b of the shift switch 212 will be opened thus also breaking the second branch of the switching circuit. Only the underarm can be driven which is done by shifting the feed gears to underarm drive position and hence closing the second section 212b of the shift switch. It is assumed that the underarm is unclamped to close the clamp switch 217 and an end limit has not been reached so that either one or the other of the end limit switches 221, 222 will be closed. Similarly, if the underarm is clamped, the underarm cannot be driven since the second branch of the switching circuit will be broken by the clamp switch 217 and the drive clutches will be engaged only if the feed transmission is shifted to feed the spindle which closes the first section 212a of the shift switch 212 thus completing the first branch of the switching circuit. A versatile and flexible interlock means is thereby provided for the main spindle and underarm which is capable of fully protecting the main spindle and underarm against incorrect operation but at the same time is adaptable to a wide variety of machining operations.

We claim as our invention:

1. In a machine tool having a headstock housing, a spindle and underarm on said housing mounted for axial translation parallel to each other, the combination comprising feed transmission means for said underarm and said spindle including a rearwardly extending power shaft in said housing, an extension shaft adjacent the rear end of said power shaft in coaxial alinement therewith and having gear means including a rack and gear connection with said spindle for translation of the latter, a horizontally extending underarm driving shaft positioned transversely to said underarm and having a gear and rack connection at its inner end portion for translation of said underarm and a pinion gear on its outer end portion, a gear fixed on the rear end portion of said power shaft, a first shiftable gear slidably mounted on the forward end portion of said extension shaft for movement into a series of shift positions, said headstock housing having an opening overlying said pinion gear, fixed gear and slidable gear, a cover plate removably attached to said housing for closing said opening, gear transmission means for drivingly connecting said gear of said power shaft to said extension shaft and to said underarm driving shaft alternatively and at direct and reduced speed ratios, and said gear transmission means including a first intermediate gear engageable with said fixed gear, a second intermediate gear engageable with said first slidable gear in one of its shift positions, and a pinion gear engageable with said pinion gear on said underarm driving shaft, said gear transmission means being mounted as a unit on said cover plate for assembly with and disassembly from said headstock upon installation and removal of said cover plate.

2. In a machine tool having a headstock housing, a spindle and underarm on said housing mounted for axial translation parallel to each other, the combination comprising feed transmission means for said underarm and said spindle including a rearwardly extending power shaft, an extension shaft adjacent the rear end of said power shaft in coaxial alinement therewith and having gear means for drivingly connecting said extension shaft with said spindle for translation of the latter, an underarm driving shaft having gear means for drivingly connecting the same to said underarm for translation of said underarm and having a pinion gear fixed to said underarm drive shaft, a gear fixed on the rear end portion of said power shaft, a gear mounted on the forward end portion of said extension shaft, said headstock housing having an opening overlying said pinion gear, power shaft gear and extension shaft gear, a cover plate removably attached to said housing for closing said opening, and gear transmission means including a gear shift mechanism for drivingly connecting said gear of said power shaft to said extension shaft and to said underarm driving shaft alternatively, said gear transmission means including a first gear engageable with said power shaft gear, a second gear engageable with said extension shaft gear, and a third gear engageable with said pinion gear on said underarm driving shaft, said gear transmission means being mounted as a unit on said cover plate and being arranged for engagement of said first, second and third gears with their respective mating gears upon installation of said cover plate and disengagement of said gears upon removal of said plate.

3. In a headstock for a machine tool having a spindle mounted for axial translation and an underarm support mounted on said headstock for axial translation in spaced parallel relation to said spindle, the combination comprising feed transmission means for said spindle a rearwardly extending power shaft driven by said feed transmission means, an extension shaft at the rear end of said power shaft and coaxially alined therewith, said extension shaft having means on its rear end portion for translating said spindle upon rotation of said extension shaft, an underarm drive shaft journaled in said headstock and having a rack and gear connection with said underarm for translating the latter, a pinion gear on the rear end of said power shaft, a first slidable clutch gear mounted on the forward end of said extension shaft, clutch teeth on said pinion and said slidable gear for providing a direct drive connection between power shaft and said extension upon shifting said first slidable gear to its forward end position, a cluster gear having a first intermediate gear adapted to mesh with said pinion gear and a second intermediate gear positioned to mesh with said first slidable gear upon shifting the latter to its rear position for providing a reduced speed drive connection between said power shaft and said extension shaft, a stub shaft having a freely rotatable gear element and a second slidable gear mounted for rotation with said stub shaft, said freely rotatable gear element being positioned to be in mesh with said first intermediate gear, said freely journaled gear element and said second slidable gear having mating clutch elements engageable upon shifting said second slidable gear to one end position for establishing a driving connection to said stub shaft, said slidable gear being positioned to engage the second intermediate gear upon shifting the former to its other end position for establishing a reduced speed driving connection to said stub shaft, a gear train for drivingly connecting said stub shaft to said underarm drive shaft, and shift means on said headstock for shifting said first and second slidable gears to drive said spindle and underarm.

4. In a machine tool having a headstock having a spindle mounted for axial translation, feed transmission means for said spindle, and an underarm support mounted on said headstock for axial translation in spaced parallel relation to said spindle, the combination comprising a rearwardly extending power shaft driven by said feed transmission means and an extension shaft at the rear end of said power shaft and coaxially alined therewith, said extension shaft having means on its rear end portion for translating said spindle upon rotation of said extension shaft, an underarm drive shaft journaled in said housing and having a rack and gear connection with said underarm for translating the latter, a pinion gear fixed on the rear end of said power shaft, a first slidable clutch gear mounted on the forward end of said extension shaft, clutch teeth on said pinion and said slidable gear for providing a direct drive connection between said power shaft and said extension shaft upon shifting said first slidable gear to its forward end position, said headstock having an opening therein overlying said pinion gear and first slidable clutch gear, a cover plate adapted to be attached to said housing to cover the said opening, said cover plate having a gear means mounted thereon including a cluster gear having a first intermediate gear adapted to mesh with said pinion gear and a second intermediate gear positioned to mesh with said first slidable gear upon shifting the latter to its rear position for providing a reduced speed drive connection between said power shaft and said extension shaft, said gear means also including a stub shaft having a freely rotatable gear element and a second slidable gear mounted for rotation with said stub shaft, said freely rotatable gear element being positioned to be in mesh with said first intermediate gear, said freely journaled gear element and said second slidable gear having mating clutch elements engageable upon shifting said second slidable gear to one end position for establishing a driving connection to said stub shaft, said slidable gear being positioned to engage the second intermediate gear upon shifting the former to its other end position for establishing a reduced speed driving connection to said stub shaft, said gear means further including a gear train for drivingly connecting said stub shaft to said underarm drive shaft, and shift means on said cover plate for shifting said first and second slidable gears to drive said spindle and underarm, said shift means being arranged to move one of said slidable gears to a neutral position before moving the other of said slidable gears to a drive position to prevent simultaneous drive of said spindle and underarm.

5. In a machine tool, the combination comprising a headstock housing, an underarm mounted on said housing for forward and rearward axial translation to and from said housing, means including a releasable clutch for establishing a driving connection to said underarm for axially translating the same, said clutch being positioned on the side of said headstock housing in upwardly spaced relation to said underarm and having an inwardly projecting operator rod arranged to release said clutch upon axial movement of said rod, an abutment positioned adjacent said underarm and projecting forwardly in a direction substantially parallel to said underarm, said abutment being mounted in the forward face of said headstock for axial sliding in a horizontal direction, a vertical rock shaft journaled in said housing for rotation about a vertical axis, said rock shaft being positioned and having a length such that its lower end portion is in horizontal alinement with said abutment and its upper end portion is in horizontal alinement with said clutch operator rod, a first rack and gear connection between said abutment and said rock shaft for rotating the latter upon rearward movement of said abutment, a horizontally disposed cam shaft positioned for axial sliding movement and positioned in alinement with the upper end portion of said rock shaft and said clutch operator rod, and a second rack and gear connection between said cam shaft and said rock shaft for moving the former rearwardly upon rotation of said rock shaft, said cam shaft having an inclined cam surface on its rear end portion for camming said clutch operator shaft axially to release said clutch upon said abutment being moved rearwardly by engagement with a rearwardly moving attachment on said underarm.

6. In a machine tool having a headstock with an axially translatable spindle, an underarm mounted on said headstock for axial translation in spaced parallel relation to said spindle and adapted to be interconnected with said spindle for joint translation, means for clamping said underarm in a fixed axial position and feed transmission means including a shift mechanism for establishing an axial feed connection to said spindle and underarm for translating the latter two alternatively, the combination comprising control means operable by said shift mechanism upon shifting said feed transmission means, a first means cooperatively associated with said control means and operative upon actuation of the latter for establishing a feed connection to said underarm alone when said underarm and spindle are interconnected for joint translation, a second means cooperatively associated with said control means and operative upon actuation of the latter for establishing a feed connection to said spindle alone when said underarm is clamped in fixed position, and a third means cooperatively associated with said control means and operative upon actuation of the latter to establish a feed connection to said underarm and for disengaging said feed connection at the end of a stroke of said underarm.

7. In a machine tool having a headstock with an axially translatable spindle and underarm, means for clamping said underarm in a fixed axial position and feed gear means including a shift mechanism for establishing a gear feed connection to said spindle and underarm alternatively, the combination comprising electrically controlled clutch means for engaging and disengaging the feed connection to both said spindle and underarm, a control switching circuit having first and second parallel branches, said circuit being arranged to cause disengagement of said clutch means upon interrupting said circuit, said circuit having a shift switch with a normally open section in said first branch and a normally closed section in said second branch, means actuated by said shifting mechanism for closing said normally open shift switch section and opening said normally closed section upon establishing a gear feed connection to said spindle, a normally closed switch connected in series in said first branch and positioned on the forward end portion of said underarm and adapted to be operated to open position upon connection of an attachment to said forward end portion for causing joint translation of said underarm, a clamp switch connected in said second branch, means for opening said clamp switch upon clamping of said underarm for disengaging said clutch means when said underarm is clamped and said shift means has established gear feed connection to said underarm, a pair of end limit switches connected in parallel with each other and in series with said second branch, means for actuating said pair of end limit switches upon movement of said underarm to predetermined end positions of travel for interrupting said second branch upon completion of a stroke of the underarm.

8. In a machine tool having a headstock housing, a spindle and underarm on said housing mounted for axial translation parallel to each other, and feed transmission means for said underarm and said spindle including a rearwardly extending power shaft, the combination comprising an extension shaft adjacent the rear end of said power shaft in coaxial alinement therewith and having means for translating said spindle upon rotation of said extension shaft, an underarm driving shaft on said headstock having means for translating said underarm upon rotation of said underarm driving shaft, a first gear fixed on the rear end portion of said power shaft, a second gear slidably mounted on the forward end portion of said extension shaft for movement into a series of shift positions, said housing having an opening overlying said pinion gear, fixed gear and slidable gear, a cover plate removably attached to said housing for closing said opening, gear transmission means for drivingly connecting said gear of said power shaft to said extension shaft and to said underarm driving shaft alternatively and at direct and reduced speed ratios, said gear transmission means including a first intermediate gear engageable with said fixed gear, a second intermediate gear engageable with said first slidable gear in one of its shift positions, and a pinion gear engageable with said pinion gear on said underarm driving shaft, and a switching mechanism including a trip disk having adjustable trip dogs about its periphery, a pair of end limit switching mechanisms having switch actuators lying in the path of rotational movement of said trip dogs to actuate said switches individually for said feed transmission at the end of a stroke of said underarm, and a chain and sprocket drive from said gear transmission means to said trip disk for driving the latter in synchronism with said underarm, said gear transmission means and said switching mechanism being mounted as a unit on said cover plate for assembly with and disassembly from said headstock upon installation and removal of said cover plate.

References Cited in the file of this patent

UNITED STATES PATENTS

| | | |
|---|---|---|
| 1,548,576 | Bachtel | Aug. 4, 1925 |
| 2,118,024 | Potter et al. | May 17, 1938 |
| 2,251,015 | Gallimore | July 29, 1941 |
| 2,275,783 | Martellotti | Mar. 16, 1942 |
| 2,376,303 | Woytych | May 15, 1945 |
| 2,401,705 | Mihalyi | June 4, 1946 |
| 2,449,546 | Buckendale | Sept. 21, 1948 |
| 2,570,275 | Reading | Oct. 9, 1951 |
| 2,620,710 | Gallimore | Dec. 9, 1952 |
| 2,621,566 | Armitage et al. | Dec. 16, 1952 |
| 2,730,021 | Gallimore et al. | Jan. 10, 1956 |

FOREIGN PATENTS

| | | |
|---|---|---|
| 387,776 | Great Britain | Feb. 16, 1933 |